US011782181B2

(12) United States Patent
Kasten et al.

(10) Patent No.: US 11,782,181 B2
(45) Date of Patent: Oct. 10, 2023

(54) DATA FUSION ENHANCED MULTI-MODALITY WELLBORE INTEGRITY INSPECTION SYSTEM

(71) Applicant: GE Energy Oilfield Technology, Inc., Broussard, LA (US)

(72) Inventors: Ansas Matthias Kasten, Niskayuna, NY (US); Yuri Plotnikov, Chesterfield, VA (US); Sudeep Mandal, Broussard, LA (US); Sarah Lillian Katz, Albany, NY (US); Frederick Wheeler, Niskayuna, NY (US); William Robert Ross, Rotterdam, NY (US); John Scott Price, Niskayuna, NY (US)

(73) Assignee: GE Energy Oilfield Technology, Inc., Broussard, LA (US)

( * ) Notice: Subject to any disclaimer, the term of this patent is extended or adjusted under 35 U.S.C. 154(b) by 247 days.

(21) Appl. No.: 16/102,371

(22) Filed: Aug. 13, 2018

(65) Prior Publication Data
US 2019/0049622 A1 Feb. 14, 2019

Related U.S. Application Data

(60) Provisional application No. 62/544,188, filed on Aug. 11, 2017, provisional application No. 62/544,180, (Continued)

(51) Int. Cl.
*E21B 47/16* (2006.01)
*G01V 5/10* (2006.01)
(Continued)

(52) U.S. Cl.
CPC ............ *G01V 5/107* (2013.01); *E21B 47/085* (2020.05); *E21B 47/117* (2020.05); *E21B 47/13* (2020.05);
(Continued)

(58) Field of Classification Search
CPC ...... E21B 47/085; E21B 47/117; G01V 5/107
See application file for complete search history.

(56) References Cited

U.S. PATENT DOCUMENTS 9,696,455 B2 * 7/2017 Radtke ................... G01V 5/104
9,746,583 B2 * 8/2017 Berkcan ................. G01V 5/145
(Continued)

FOREIGN PATENT DOCUMENTS

WO 2017/019718 2/2017

OTHER PUBLICATIONS

International Search Report and Written Opinion dated Oct. 25, 2018 in corresponding PCT Application No. PCT/US18/46520.

*Primary Examiner* — Mohammad K Islam
(74) *Attorney, Agent, or Firm* — Hogan Lovells US LLP

(57) ABSTRACT

A downhole multi-modality inspection system includes a first imaging device operable to generate first imaging data and a second imaging device operable to generate second imaging data. The first imaging device includes a first source operable to emit energy of a first modality, and a first detector operable to detect returning energy induced by the emitted energy of the first modality. The second imaging device includes a second source operable to emit energy of a second modality, and a second detector operable to detect returning energy induced by the emitted energy of the second modality. The system further includes a processor configured to receive the first imaging data and the second imaging data, and integrate the first imaging data with the second imaging data into an enhanced data stream. The processor correlates the first imaging data and the second imaging data to provide enhanced data for detecting potential wellbore anomalies.

21 Claims, 9 Drawing Sheets

Related U.S. Application Data filed on Aug. 11, 2017, provisional application No. 62/544,131, filed on Aug. 11, 2017.

(51) Int. Cl.
| | |
|---|---|
| E21B 47/13 | (2012.01) |
| E21B 47/085 | (2012.01) |
| E21B 47/117 | (2012.01) |
| E21B 47/135 | (2012.01) |
| G06F 17/15 | (2006.01) |
| G01V 1/44 | (2006.01) |
| G01V 3/30 | (2006.01) |
| G01V 5/14 | (2006.01) |
| G01V 8/16 | (2006.01) |
| G01V 11/00 | (2006.01) |

(52) U.S. Cl.
CPC ............ *E21B 47/135* (2020.05); *E21B 47/16* (2013.01); *G01V 1/44* (2013.01); *G01V 3/30* (2013.01); *G01V 5/10* (2013.01); *G01V 5/145* (2013.01); *G01V 8/16* (2013.01); *G01V 11/00* (2013.01); *G06F 17/15* (2013.01)

(56) References Cited

U.S. PATENT DOCUMENTS

| | | | |
|---|---|---|---|
| 10,465,509 B2* | 11/2019 | Yao | E21B 47/09 |
| 2007/0185946 A1* | 8/2007 | Basri | G06T 7/11 |
| | | | 708/200 |
| 2007/0238954 A1* | 10/2007 | White | G06T 5/50 |
| | | | 600/407 |
| 2010/0040259 A1 | 2/2010 | Morris | |
| 2012/0230151 A1 | 9/2012 | Almaguer | |
| 2016/0061991 A1* | 3/2016 | Berkcan | G01V 5/145 |
| | | | 250/269.2 |
| 2018/0136366 A1* | 5/2018 | Vega-Avila | H02S 40/00 |

\* cited by examiner

DATA FUSION ENHANCED MULTI-MODALITY WELLBORE INTEGRITY INSPECTION SYSTEM

CROSS REFERENCE TO RELATED APPLICATION

This application claims priority to and the benefit of U.S. Provisional Application Ser. No. 62/544,131, filed Aug. 11, 2017, titled "WELLBORE DETECTOR WITH AZIMUTHAL AND SPECTRAL ENERGY RESOLUTION"; U.S. Provisional Application Ser. No. 62/544,180, filed Aug. 11, 2017, titled "MULTI-BARRIER WELLBORE INTEGRITY INSPECTION SYSTEM WITH ECCENTRICITY CORRECTION"; and U.S. Provisional Application Ser. No. 62/544,188, filed Aug. 11, 2017, titled "DATA FUSION ENHANCED MULTI-MODALITY WELLBORE INTEGRITY INSPECTION SYSTEM", the full disclosures of which are each hereby incorporated herein by reference in their entirety for all purposes.

The full disclosures of U.S. patent application Ser. No. 16/102,221, concurrently filed on Aug. 13, 2018, titled "WELLBORE DETECTOR WITH AZIMUTHAL AND SPECTRAL ENERGY RESOLUTION"; and U.S. patent application Ser. No. 16/103,323, concurrently filed on Aug. 13, 2018, titled "MULTI-BARRIER WELLBORE INTEGRITY INSPECTION SYSTEM WITH ECCENTRICITY CORRECTION", are each hereby incorporated herein by reference in their entirety for all purposes.

GOVERNMENT LICENSE RIGHTS

This invention was made with U.S. Government support under Contract No. DE-FE0024293 awarded by the Department of Energy. The U.S. Government has certain rights in this invention.

FIELD OF INVENTION

This invention relates in general to wellbore integrity inspection, and more particularly to systems and methods for detecting wellbore defects.

BACKGROUND

Hydrocarbon producing wellbores typically require verification of the integrity of the wellbore structure for commissioning, during extended operation, and for decommissioning purposes. Particularly for decommissioning of offshore wells, it is of high interest to verify the integrity of the wellbore-to-formation boundary to ensure that the offshore well can be effectively plugged and abandoned. Thus, the integrity of wellbore-to-formation boundary needs to be verified before a plug and abandon operation can begin. For example, this may include verifying that there are no significant channel defects in the cement structure of the wellbore. Typically, as a first inspection step, the production casing is removed before the integrity of a wellbore can be measured using conventional inspection tools. The casing removal process, which may include the removal of 10,000 feet of casing, is time consuming and costly. Furthermore, integrity inspection of multi-barrier wellbores, with multiple casing and cement annuli, is a challenging task.

SUMMARY

Applicant recognized the problems noted above herein and conceived and developed embodiments of systems and methods, according to the present disclosure, for wellbore inspection systems.

In some embodiments, a downhole inspection system includes a tool string lowerable into a wellbore, a first imaging device forming at least a portion of the tool string, the first imaging device operable to generate first imaging data for detecting potential wellbore anomalies, and a second imaging device forming at least another portion of the tool string, the second imaging device operable to generate second imaging data for detecting potential wellbore anomalies. The first imaging device includes a first source operable to emit energy of a first modality towards a target, and a first detector operable to detect returning energy from the target. The second imaging device includes a second source operable to emit energy of a second modality towards the target, and a second detector operable to detect returning energy from the target. The system further includes a processor configured to receive the first imaging data and the second imaging data, and integrate the first imaging data with the second imaging data to provide enhanced data for detecting wellbore anomalies.

In another embodiment, a downhole inspection system includes a first imaging device operable to generate first imaging data and a second imaging device operable to generate second imaging data. The first imaging device includes a first source operable to emit energy of a first modality, and a first detector operable to detect returning energy induced by the emitted energy of the first modality. The second imaging device includes a second source operable to emit energy of a second modality, and a second detector operable to detect returning energy induced by the emitted energy of the second modality. The system further includes a processor configured to receive the first imaging data and the second imaging data, and integrate the first imaging data with the second imaging data into an enhanced data stream.

In another embodiment, a method of inspecting a wellbore includes positioning a first imaging device in a wellbore having a casing comprising one or more layers, emitting energy of a first modality towards a portion of the wellbore, detecting first returning energy from the portion of the wellbore, and generating first imaging data for the portion of the wellbore based at least in part on the detected first returning energy. The method further includes positioning a second imaging device in the wellbore, generating energy of a second modality towards the portion of the wellbore, detecting second returning energy from the portion of the wellbore, and generating second imaging data for the portion of the wellbore based at least in part on the detected second returning energy. The method further includes correlating the first imaging data and the second imaging data to provide enhanced data for detecting potential wellbore anomalies.

DETAILED DESCRIPTION OF THE INVENTION

Figure 1:
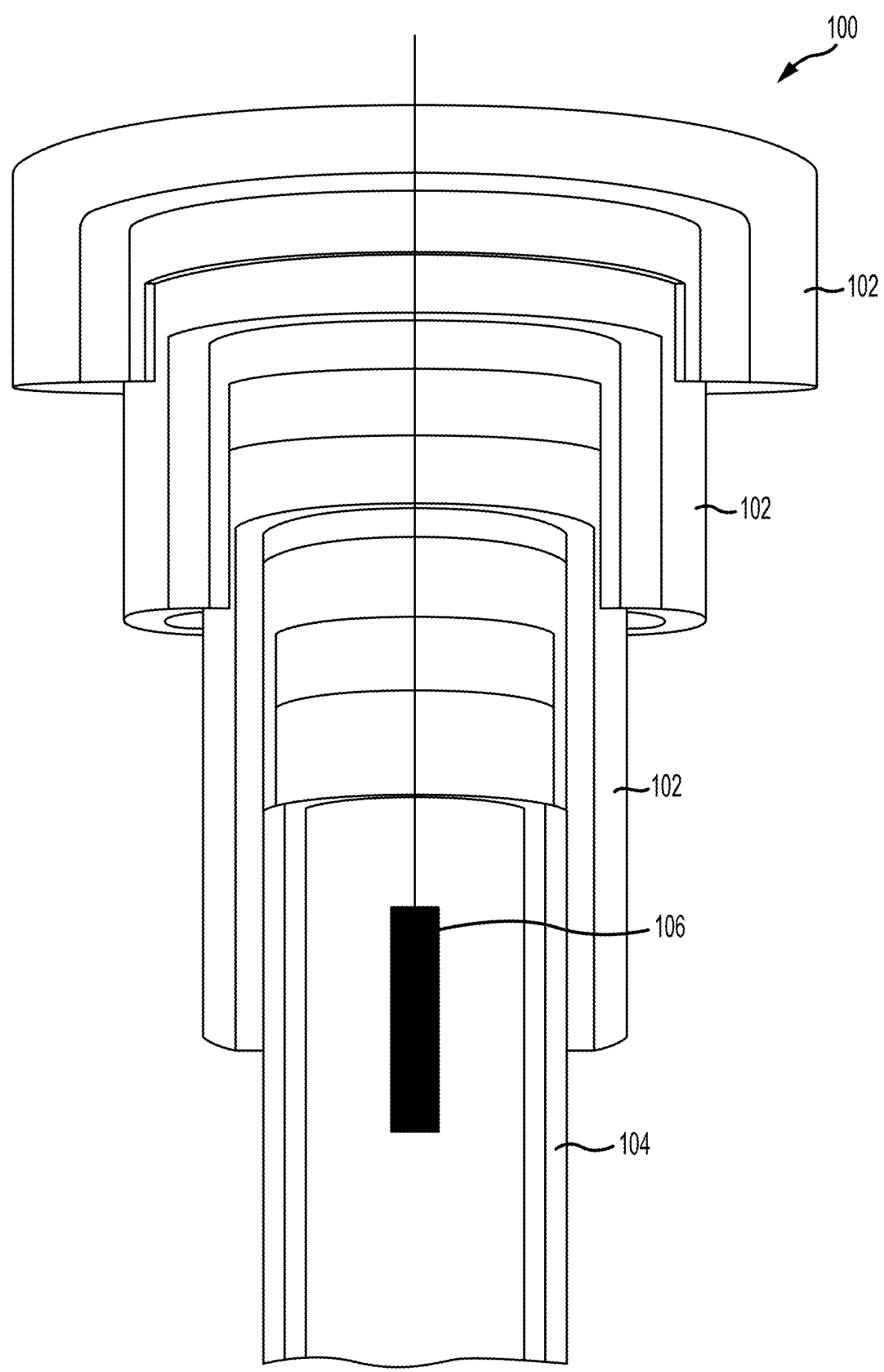
FIG. 1 is a cross-sectional view of a well integrity inspection system illustrating a well structure and a multi-modality inspection probe, in accordance with various embodiments.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

In various embodiments, like components may be referred to with the same reference numerals throughout the specification. However, in certain embodiments, different reference numerals may be used for clarity. Additionally, components of a similar nature may be referred to with a reference numeral and a letter, such as A and B, for clarity, and should not be construed as limiting. For example, while similar components may be referred to with reference numerals and an associated A and B, there components may have different sizes, shapes, or different operational mechanisms.

The presently disclosed wellbore detector assembly allows for detection of wellbore defects, such as oil based mud channel defects among others, deep into the wellbore structure and for through-casing inspection, in which the wellbore can be inspected for defects without requiring removal of the production tubing. Thus, the present techniques may provide time and cost improvements for inspecting wellbores and for plug and abandonment operations. Described herein is a well integrity inspection system configured to inspect a well structure having multiple casing or tubing layers. The well integrity inspection system includes one or more inspection probes positioned in the well structure. An inspection probe may include a plurality of interrogation modalities each having an excitation assembly for transmitting a plurality of emissions into the well structure. Example interrogation modalities may include any or all or a neutron excitation modality, an x-ray modality, a gamma modality, an ultrasound modality, an acoustic modality, a fiber optical modality, an electromagnetic modality, a magnetic modality, among others. While each of these modalities can be used to obtain various types of well information, data from the various combinations of these example modalities among other modalities may be combined to obtain even more information regarding the integrity of the well structure or other well insights that modalities do not provide when used individually.

FIG. 1 is a partial cross-sectional view of a well integrity inspection system, illustrating a multi-barrier wellbore 100 with a plurality barriers, such as casing 102, tubing 104, cement layers, and the like. The wellbore 100 may have a series of cylindrical metal casing 102 and cement wall layers between the casing layers 102. The well 100 may be any type of well, including but not limited to conventional and unconventional hydrocarbon producing wells. An inspection tool 106 may be deployed downhole into the well 100 to perform various logging functions, such as detection of various anomalies, such as well defects, eccentricity, flaw structure, topology, integrity, and other information. The inspection tool 106 may also include detectors for performing measurements of resistivity, neutron porosity, formation bulk density, formation photoelectric factor, natural gamma-ray radiation, among others, using various methods of inspection to determine the status of well structure. The inspection tool 106 includes a multi-modality imaging technique that collects imaging information obtained from multiple measurement modalities, and the data from various combinations of the modalities are integrated to discover various other measurements or insights regarding the well structure.

As shown in FIG. 1, inspection tool 106 traverses into the wellbore for determining well integrity of the multi-barrier well. In some embodiments, the inspection tool 106 can determine defects or other anomalies in the barriers (e.g., casings) of the multi-barrier well and/or the plurality of annuli between the barriers. In an example embodiment, a system provides means for detecting and accounting for casing eccentricity, which may be useful for providing various information about well. In such embodiments, the system may include an imaging device such as a neutron probe or gamma prove for annulus defect detection and an electromagnetic probe for detecting wellbore casing eccentricity. Thus, confounding effects of wellbore eccentricity may be removed, revealing more accurate defect information. The inspection tool 106 may be deployed at the different depths inside the wellbore, and therefore has material and structural integrity to withstand the high pressures and high temperatures at these depths.

In various embodiments, inspection probe includes numerous interrogation modalities, each having a respective excitation assembly for generating the respective beam or signal to make various wellbore measurements. The wellbore measurement information from each imaging modality may be analyzed and fused with data from other imaging modalities. The inspection probe may include all or a subset of the following imaging modalities. For example, the inspection probe may include a neutron modality to detect annular defects, such as by measuring differences in hydrogen content, which may be indicative of an oil based mud (OBM) channel defect or a good cement annulus. The inspection probe may include an x-ray modality for detecting bonding defects. The inspection probe may include a gamma modality to measure differences in material densities, such as for detecting an air void or a defect free steel casing. The inspection probe may include an electromagnetic modality such as pulsed eddy current (PEC) to measure casing eccentricities and casing material defects. A casing eccentricity is a defect where the individual casings are not concentric. The electromagnetic modality may be blind to non-conductive materials and therefore is not influenced by density variations in cement or defects in non-conductive parts of the wellbore. The inspection probe may include an ultrasound probe to measure quality of the casing to cement annulus bond interface and thus may be used for the detection of microannuli. A microannulus is a small gap between metal casing and cement annulus. The inspection probe may also include an acoustic modality to measure fluid flow behind casings, such as fluid flow between zonal isolated sections, which may indicate a structural flaw. These modalities can provide various types information about the structural integrity of a wellbore, such as annulus defects, casing defects, casing eccentricity, cement bonding defects, fluid channel defects, among others. Data from all or a subset of these modalities may be analyzed and data fused in various combinations to gain additional insight and remove confounding factors.

Figure 2:
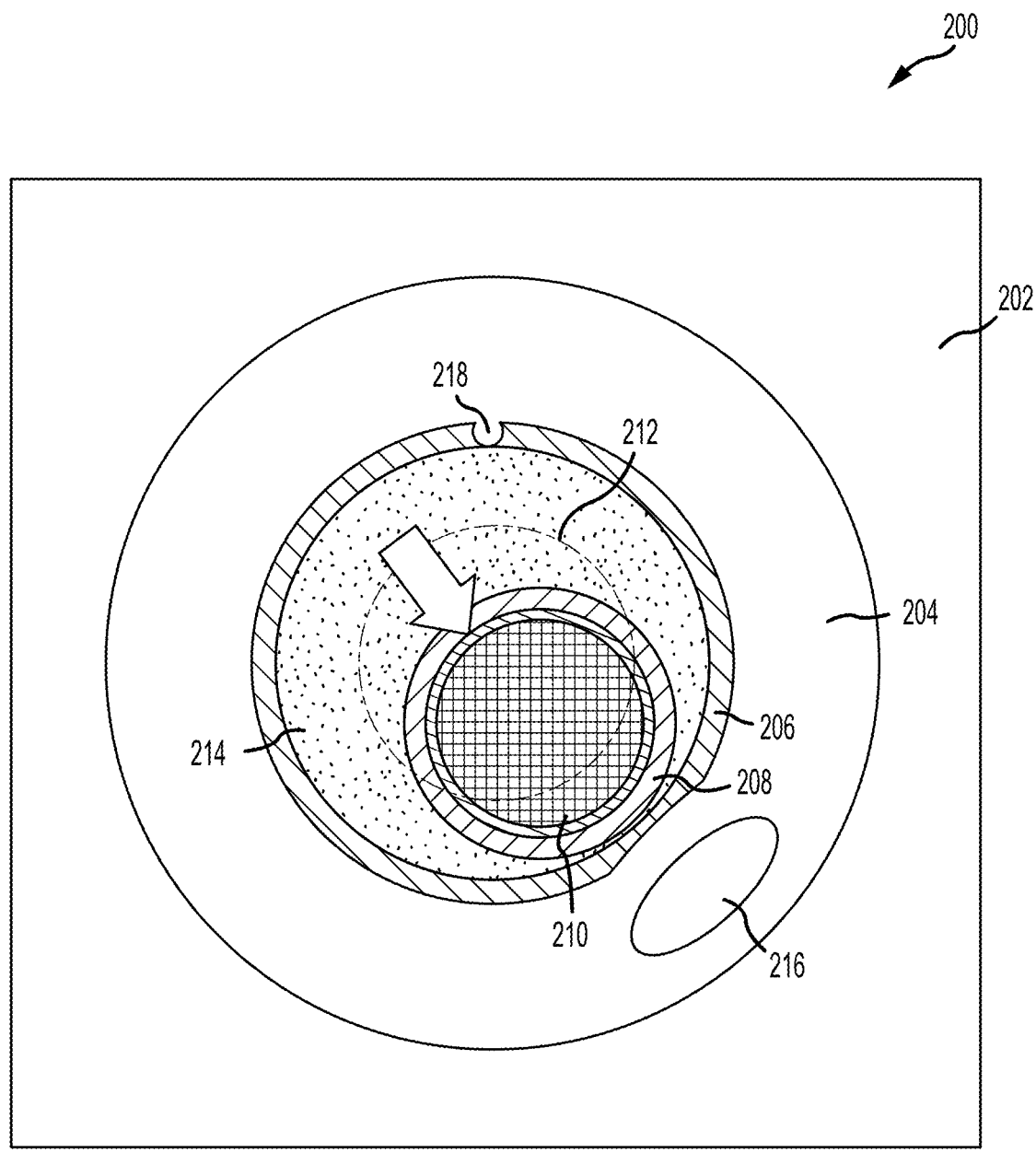
FIG. 2 illustrates a radial cross-sectional view of a wellbore with multiple confounding detects in which a multi-modality inspection approach may be advantageously used, in accordance with various embodiments.

For example, FIG. 2 illustrates a radial cross-sectional view of a wellbore 200 with multiple confounding detects in which a multi-modality inspection approach may be advantageously used, in accordance with an embodiment of the present disclosure. The wellbore 200 includes multiple nested barriers including production tubing 208, casing 206, and cement annulus 204 developed within formation 202. In some embodiments, there may be liquid 214 such as brine or sea water within the casing 206. The illustrated wellbore 200 has an annulus defect 216 and a casing defect 218. Additionally, the illustrated wellbore 200 also exhibits some eccentricity, in which the production tubing 208 is shifted away from the center position 212. An inspection tool 210 is positioned within the production tubing 208 and can detect the presence of such defects and eccentricity. For example, as the eccentricity can confound the other wellbore defect data, being able to detect the presence and configuration of the eccentricity makes it possible to remove the confounding data, thereby providing more accurate information regarding the other wellbore defects.

For example, a neutron modality may be used to identify possible wellbore defects based on hydrogen differences, and an electromagnetic interrogation modality, such as pulsed eddy currents, may detect casing eccentricity. The data collected by the electromagnetic modality can be fused with data collected from the neutron modality to correct for eccentricity that may confound data acquired by the neutron modality. In another embodiment, eccentricity data from an electromagnetic modality can be fused with a gamma modality to correct material density data collected by the gamma modality. Overlapping defects that can confound data from a single imaging modality can be filtered or isolated by using orthogonal measurement techniques involving multiple modalities.

Figure 3:
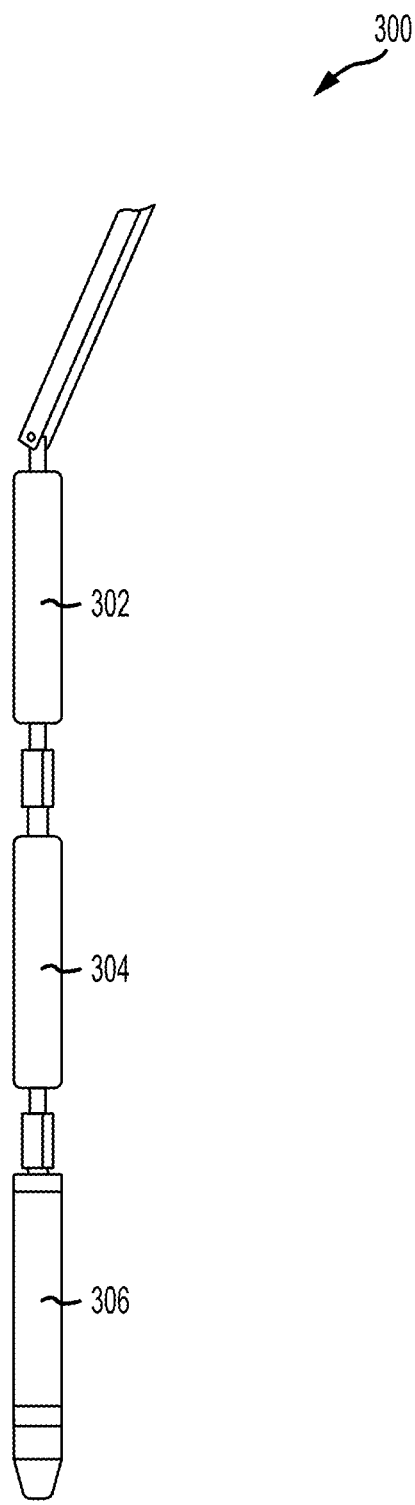
FIG. 3 includes an elevational view of an example multi-modality inspection probe, in accordance with various embodiments.

FIG. 3 includes an elevational view of an example multi-modality inspection tool 300. In the illustrated embodiment, the inspection tool 300 includes a plurality of inspection modalities including a neutron component 302, an electromagnetic component 304, and a gamma component 306. In this example, the neutron component 302 can measure differences in material composition based on hydrogen content. The electromagnetic component 304 can measure casing eccentricity and casing material defects, and the gamma component 306 can measure differences in material density. The example illustration includes three types of imaging modalities for brevity and as an example. However, in various embodiments, the inspection tool 300 may include any two or more imaging modalities and the component for providing such modalities, such as any combination of the modalities described herein among others, and the additional modalities may be similarly represented.

More generally, a downhole inspection system includes a first imaging device 302 operable to generate first imaging data and a second imaging device 304 operable to generate second imaging data, and optionally more imaging devices to generated additional modalities of imaging data. The first imaging device 302 includes a first source operable to emit energy of a first modality, and a first detector operable to detect returning energy induced by the emitted energy of the first modality. The second imaging device 304 includes a second source operable to emit energy of a second modality, and a second detector operable to detect returning energy induced by the emitted energy of the second modality. In some embodiments, the first imaging data may be indicative of the presence of a first type of wellbore anomaly and the second imaging data may be indicative of the presence of a second type of wellbore anomaly. The system further includes a processor configured to receive the first imaging data and the second imaging data, and integrate the first imaging data with the second imaging data into an enhanced data stream.

In some embodiments, the processor is located remotely from the tool string and the first imaging device or the second imaging device. For example the processor may be located at a remote facility near the wellsite or far from the wellsite. Data from the first imaging device and the second imaging device may be transmitted to the processor through many types of communication mean, including wired and wireless means, and/or a combination of different means. The data may undergo various processing or analysis, such as by intermediary processors or the like, before reaching the processor. In some embodiments, the processor may be located on the tool string or either imaging device, and/or forming a portion of the tool string, or onboard a device on the tool string.

In some embodiments, the inspection system includes a tool string lowerable into a wellbore on a single tool run. The first imaging device may form at least a portion of the tool string, and the second imaging device may forms at least another portion of the tool string, as illustrated in FIG. 3. In some embodiments, the first and second imaging devices may be two distinct tools on the tool string. In some embodiments, the first and second imaging device may components on a single tool. In some embodiments, components making up the first and second imaging device may be installed on any number of distinct tools or packaged in any combination or configuration. The inspection system may include a plurality of imaging devices of different modalities and in any combination, and is not limited to the examples illustrated herein. The inspection system may have one, two, three, four, five, or more imaging devices of respective modalities. For example, in some embodiments, the system may include a third imaging device operable to generate third imaging data, in which the third imaging device includes a third source operable to emit energy of a third modality, and a third detector operable to detect returning energy, and in which the enhanced data stream includes the third imaging data.

For example, either of the first or second imaging devices may include a gamma imaging device, in which the energy of the first modality includes gamma rays, and the first imaging data is gamma imaging data. For example, either of the first or second imaging devices may include a neutron imaging device, the energy of the first modality includes neutrons, and the first imaging data is neutron imaging data. For example, either of the first or second imaging devices may include an electromagnetic imaging device, the energy of the first modality includes electromagnetic pulses, and the first imaging data is electromagnetic imaging data. For example, either of the first or second imaging devices may include an ultrasound imaging device, the energy of the first modality includes ultrasound waves, and the first imaging data is ultrasound imaging data. The first imaging device and the second imaging device may also include any combination of a gamma device, a neutron device, an electromagnetic device, a magnetic device, an ultrasound device, an acoustic device, a fiber optical device, an x-ray device, among others.

Figure 4:
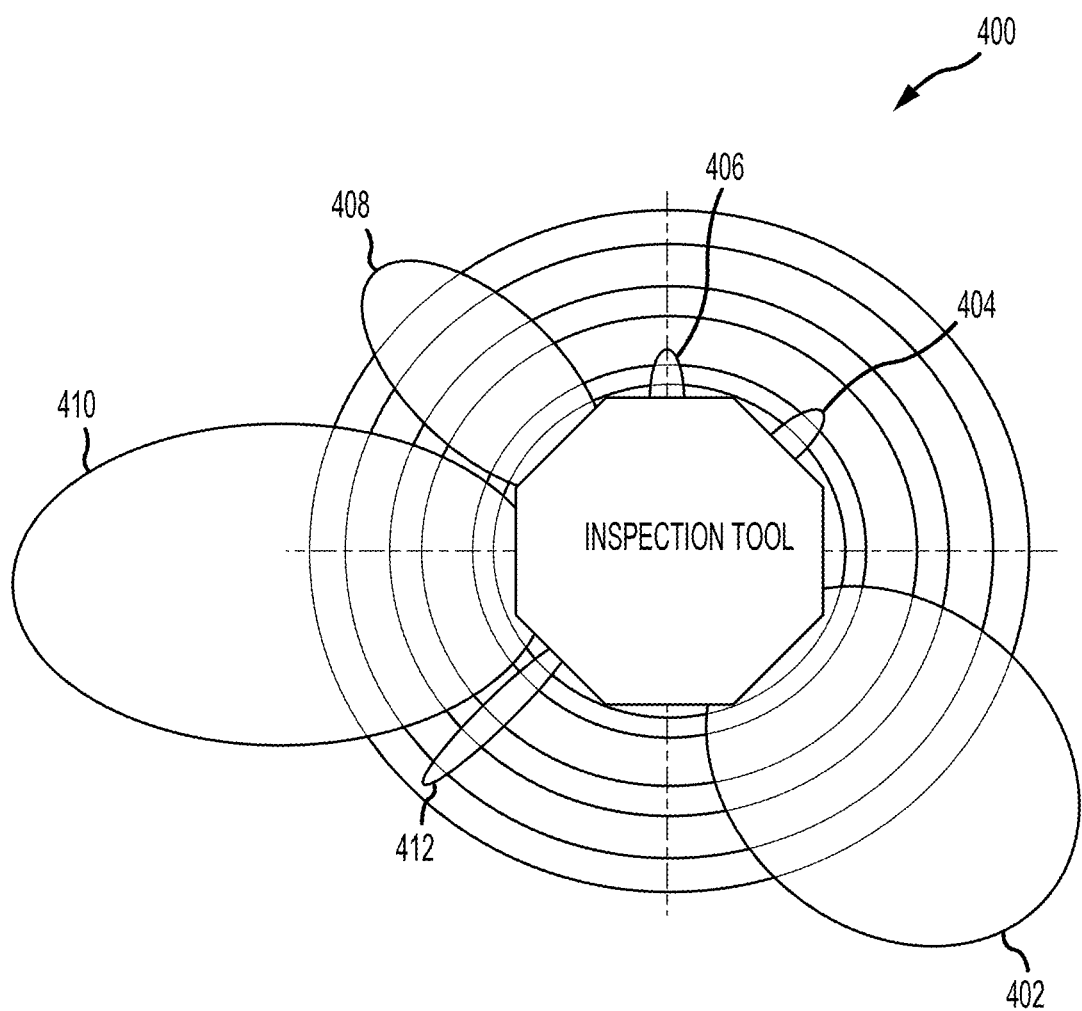
FIG. 4 is a cross-sectional illustration of radial well penetration depth and resolution of example modalities, in accordance with various embodiments.

FIG. 4 is a cross-sectional illustration 400 of radial well penetration depth and resolution of example modalities, including an electromagnetic (e.g., pulse eddy currents) modality 408, a magnetic flux leakage (MFL) modality 406, an ultrasound modality 404, an acoustic modality 410, a neutron modality 402, and a gamma modality 412. Each of these modalities may be provided by a corresponding device, or assembly of components, such as corresponding generator-detector pairs. An inspection probe may include all or a subset of these imaging modalities, among others. The wellbore measurement information from each imaging modality may be analyzed and fused with data from other imaging modalities.

As illustrated, the different modalities have different penetration depth and resolution, among other characteristics, which allows the modalities to provide different information regarding the wellbore. The neutron modality 402 may be used to detect annular defects, such as by measuring differences in hydrogen content, which may be indicative of an oil based mud (OBM) channel defect or a good cement annulus. The inspection probe may include an X-ray modality for detecting bonding defects. The gamma modality 412 may be used to measure differences in material densities, such as for detecting an air void or a defect free steel casing. The electromagnetic modality 408, such as pulsed eddy current (PEC), may be used to measure casing eccentricities and casing material defects. The electromagnetic modality may be blind to non-conductive materials and therefore is not influenced by density variations in cement or defects in non-conductive parts of the wellbore. The ultrasound modality 404 may be used to measure quality of the casing to cement annulus bond interface and thus may be used for the detection of microannuli, which is a small gap between metal casing and cement annulus. The acoustic modality 410 may be used to measure fluid flow behind casings, such as fluid flow between zonal isolated sections, which may indicate a structural flaw. These modalities can provide various types information about the structural integrity of a wellbore, such as annulus defects, casing defects, casing eccentricity, cement bonding defects, fluid channel defects, among others. Data from all or a subset of these modalities may be analyzed and data fused in various combinations to gain additional insight and remove confounding factors.

Figure 5:
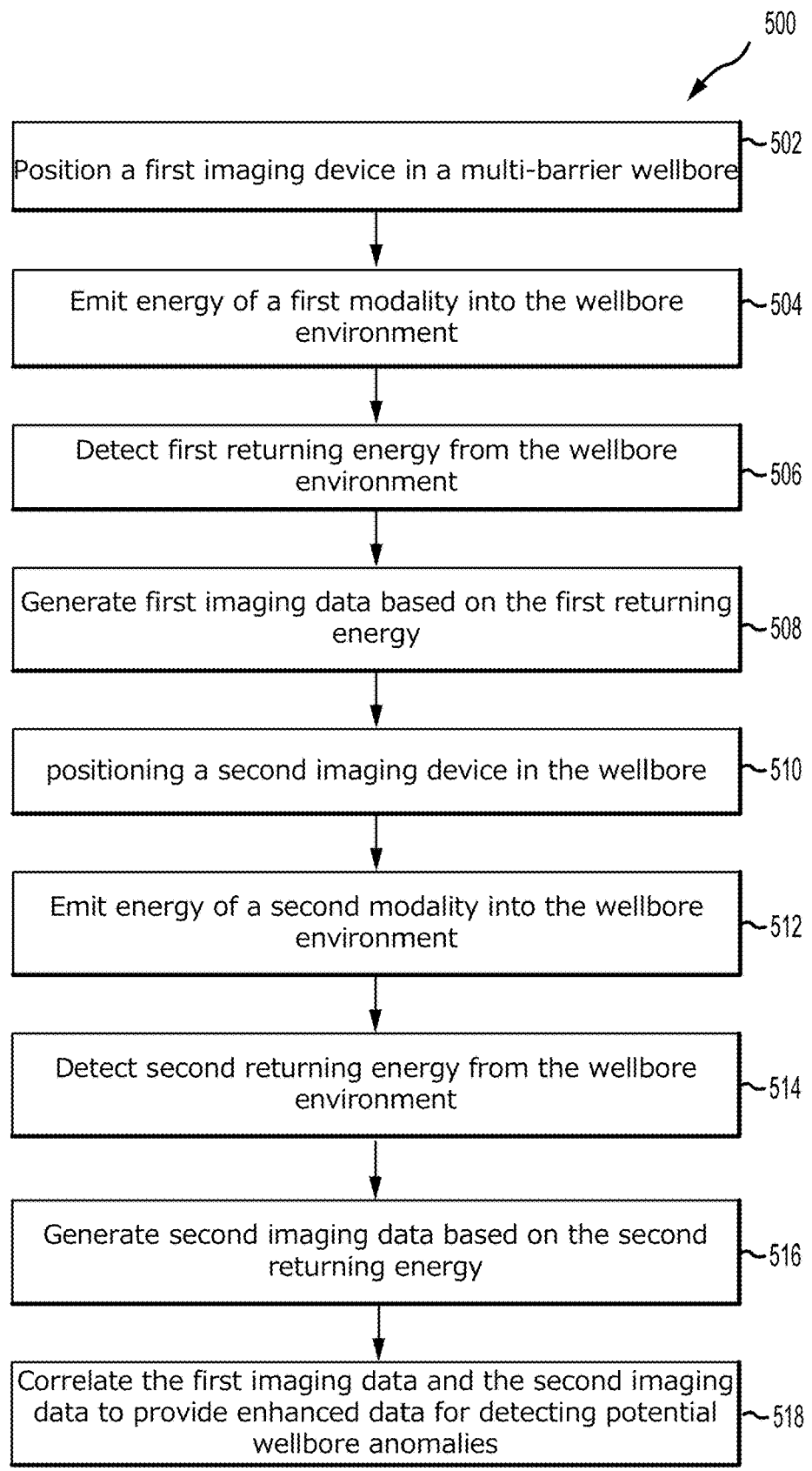
FIG. 5 is a flow diagram illustrating a method of wellbore inspection, in accordance with various embodiments.

FIG. 5 illustrates a method 500 of performing wellbore inspection using a multi-model inspection tool, in accordance with example embodiments of the present disclosure. It should be understood that, for any process or method described herein, that there can be additional, alternative, or fewer steps performed in similar or alternative orders, or concurrently, within the scope of the various embodiments unless otherwise specifically stated. In an embodiment, a method of inspecting a wellbore includes positioning 502 a first imaging device in a wellbore having a casing comprising one or more layers, emitting 504 energy of a first modality towards a portion of the wellbore, detecting 506 first returning energy from the portion of the wellbore, and generating 508 first imaging data for the portion of the wellbore based at least in part on the detected first returning energy. The method further includes positioning 510 a second imaging device in the wellbore, generating 512 energy of a second modality towards the portion of the wellbore, detecting 514 second returning energy from the portion of the wellbore, and generating 516 second imaging data for the portion of the wellbore based at least in part on the detected second returning energy. The method further includes correlating 518 the first imaging data and the second imaging data to provide enhanced data for detecting potential wellbore anomalies.

In some embodiments, the method includes lowering a tool string into the wellbore, in which the first imaging device and second imaging device a part of the tool string. In some embodiments, the first imaging device and second imaging device are axially aligned with at least one of each other, the tool string, or the wellbore. In some embodiments, the above-scribed method may further include positioning the measurement tool at a certain depth in the wellbore, and correlating the data collected by the devices with the depth. In some embodiments, the first imaging device and second imaging device are not on the same tool string, and the method includes lowering the first imaging device into the wellbore during a first tool run, and lowering the second imaging device into the wellbore during a second tool run.

In some embodiments, the first imaging data is indicative of the presence of a first type of wellbore anomaly and the second imaging data is indicative of the presence of a second type of wellbore anomaly. For example, in some embodiments, the first imaging device and the second imaging device include any combination of a gamma device, a neutron device, an electromagnetic device, a magnetic device, an ultrasound device, an acoustic device, a fiber optical device, or an x-ray device.

In some embodiments, the above-described method may further include determining an optimal function for determining whether a potential anomaly is present, and of which type. This may include obtaining training data, in which the training data including data of respective modalities detected from previous operations or simulations and the associated known existence of wellbore anomalies, and training a machine learning model using the training data, in which the machine learning model generating an optimal function for relating detected data of respective modalities and the existence of wellbore anomalies.

Given a wellbore for inspection, there may be an underlying well health state that that is to be determined. Various physical and statistical measurement models and associated measurements for each modality may be available. In some embodiments, statistical inference or optimization methods may be implemented by inverting this process flow, providing the well state given the measurements. In various embodiments, this forward modeling approach to multi-modal fusion is utilized. In the illustrated embodiments, the system may include gamma backscatter and pulsed eddy current (PEC) modalities. These two modalities have complementary aspects that make them good tests for fusion overall. Simulations of gamma backscatter may provide enough information to develop a measurement model of pipe and cement voids and loss and pipe eccentricity relative to a baseline well geometry, along with measurement statistics. Initial sensitivity and statistical models for PEC that cover material loss in pipes and eccentricity may be available or obtained through lab studies. In some embodiments, a maximum-likelihood approach may be used with linearized measurement models for each modality. Such an approach may provide insight into relative strength and benefits of the different modalities for various applications.

In various embodiments, a forward measurement models for baseline well geometries and defects relative to the baseline can be developed initially. However, in some embodiments, the measurement responses to specific normal wells can be learned adaptively as each well is scanned. Since large sections of wells are not defective and defects are rare (especially for commissioning of wells), the data fusion system can adaptively learn the response of the measurement system to each well's baseline non-defect state. The effect of defects can then be modeled as changes to this normal response.

Data fusion and well condition estimation may be improved through regularization. In some embodiments, regularization can consist of additional assumptions regarding the likelihood of well defects. Example regularization may utilize information about the physical distribution of defects. For example, such information may include whether voids or corroded regions tend to appear in groups or in isolation.

Figure 6:
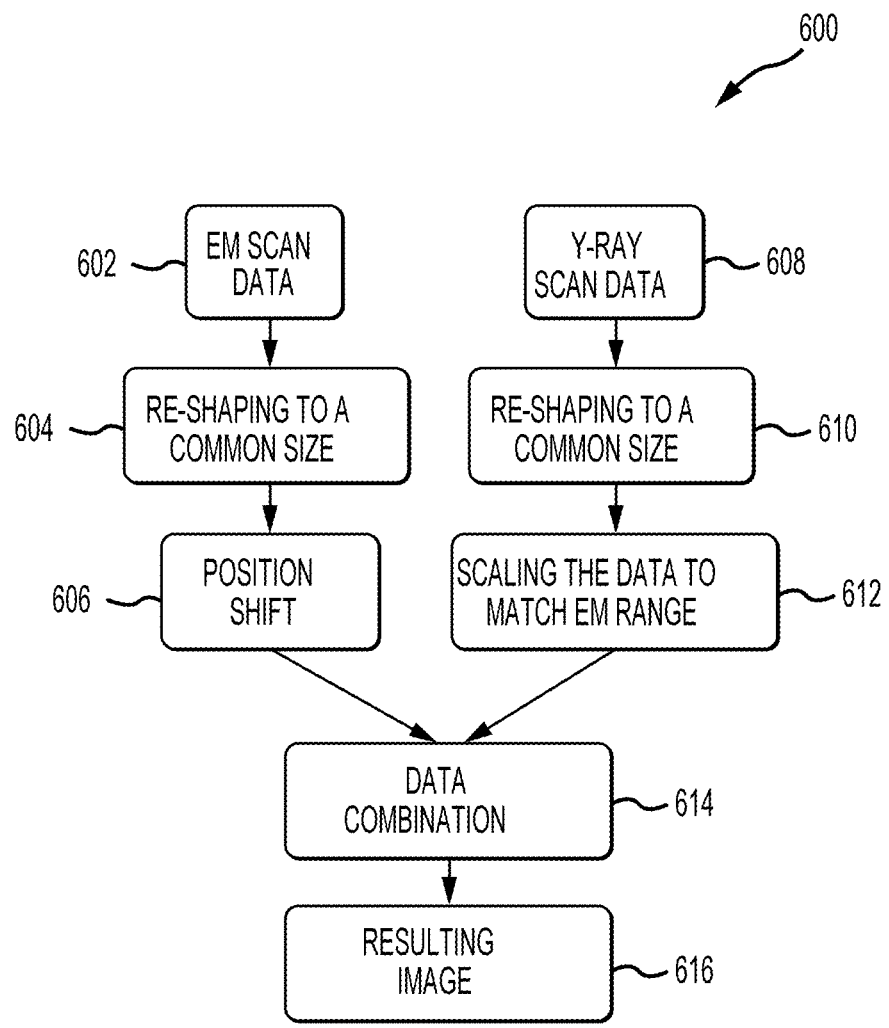
FIG. 6 is a flow diagram illustrating a multi-modality data fusion approach, in accordance with example embodiments.

In various embodiments, several steps are needed before data acquired from different imaging modalities can be combined into one image. As an example, FIG. 6 illustrates a flow 600 of multi-modality data fusion between gamma-ray and electromagnetic (pulsed eddy currents) modalities. In a first step of an example process, electromagnetic scan data 602 and gamma-ray scan data 608 are reshaped 604, 610 to a common size. Various intensities of the gamma-ray source can be chosen, based on the specific application and use-case. Larger photon fluxes result in a better signal to nose ration (SNR) but require either stronger radioactive sources or longer scanning times. The next step of the data fusion process includes combining the defect images from the two modalities and scaling them to comparable intensity levels. The electromagnetic image may undergo position sift 606 to match with that of the gamma-ray image. Next, the gamma-ray image is scaled 612 to match the intensity scale of the electromagnetic image. The images from electromagnetic and gamma-ray modalities can then be combined 614 to produce the resulting image 616 incorporating the electromagnetic scan data and the gamma scan data. In some embodiments, an increase in the photon source intensity results in a higher signal-to-noise ratio for the simulated gamma-ray images.

Figure 7A:
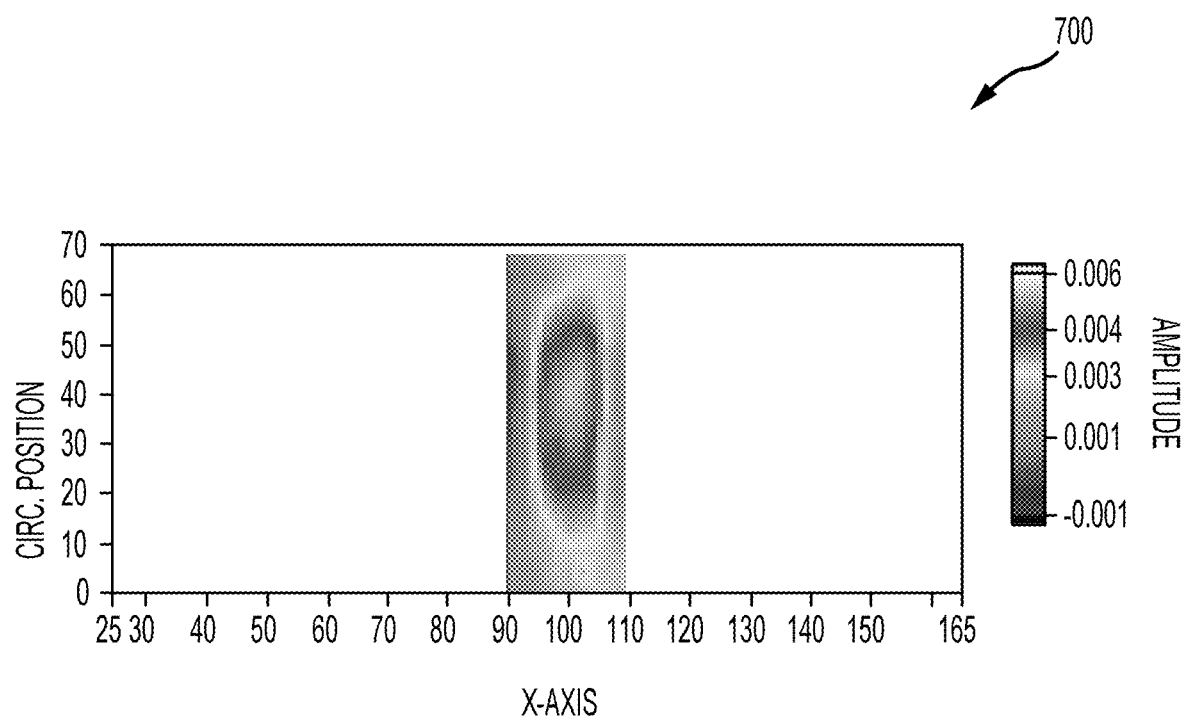
FIG. 7A illustrates an electromagnetic image of material defect.
Figure 7B:
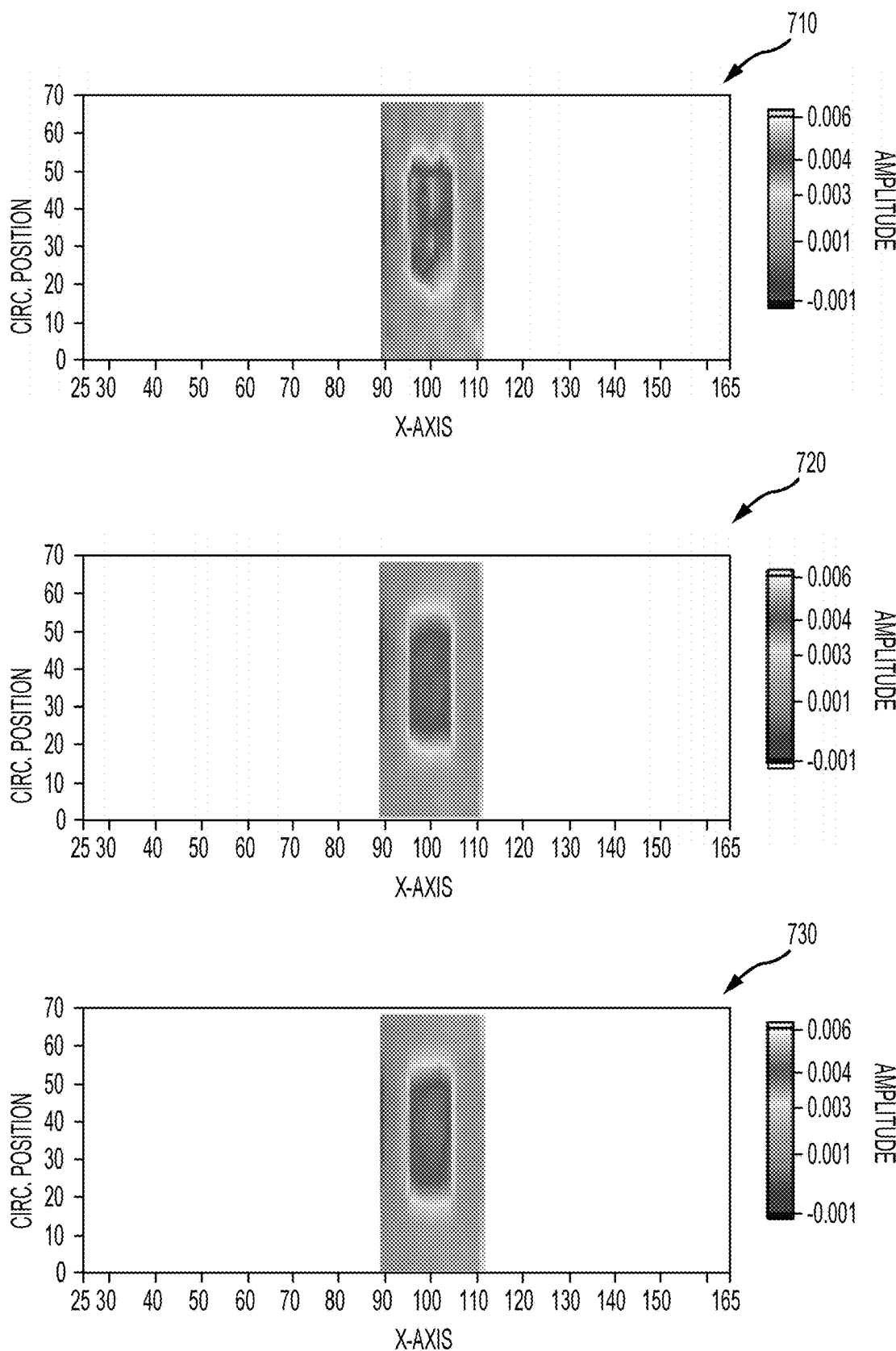
FIG. 7B illustrates fused electromagnetic and gamma-ray images of the material defect of FIG. 7A, in accordance with various embodiments.

FIG. 7A illustrates an electromagnetic image 700 of a 30% loss of material defect in a casing. As shown, the material defect is visible but the contours are washed out. FIG. 7B illustrates fused electromagnetic and gamma-ray images 710, 720, 730 of the same material defect of FIG. 7A using three levels of photon flux, in accordance with various embodiments. Specifically, image 710 illustrates a relatively low level of photon flux, image 720 illustrates a relatively medium level of photon flux, and image 730 illustrates a relatively high level of photon flux. The benefit of data fusion (i.e., integration) is illustrated, especially for the high photon flux levels. As illustrated, the fused modality data yield of FIG. 7B shows progressively improved indications of the 30% material loss defect with an increased in source strength and/or photon flux.

The approach of the multi-modality data fusion described above is an example of multi-modality well inspection. Other types of the modalities, such as neutron excitation modality, an acoustic modality, an ultrasound modality, a fiber optical modality, an electromagnetic modality, and a magnetic modality, among others, can be used in any combination in place of or in addition to the gamma-ray modality and/or the PEC modality described in the example above.

Figure 8:
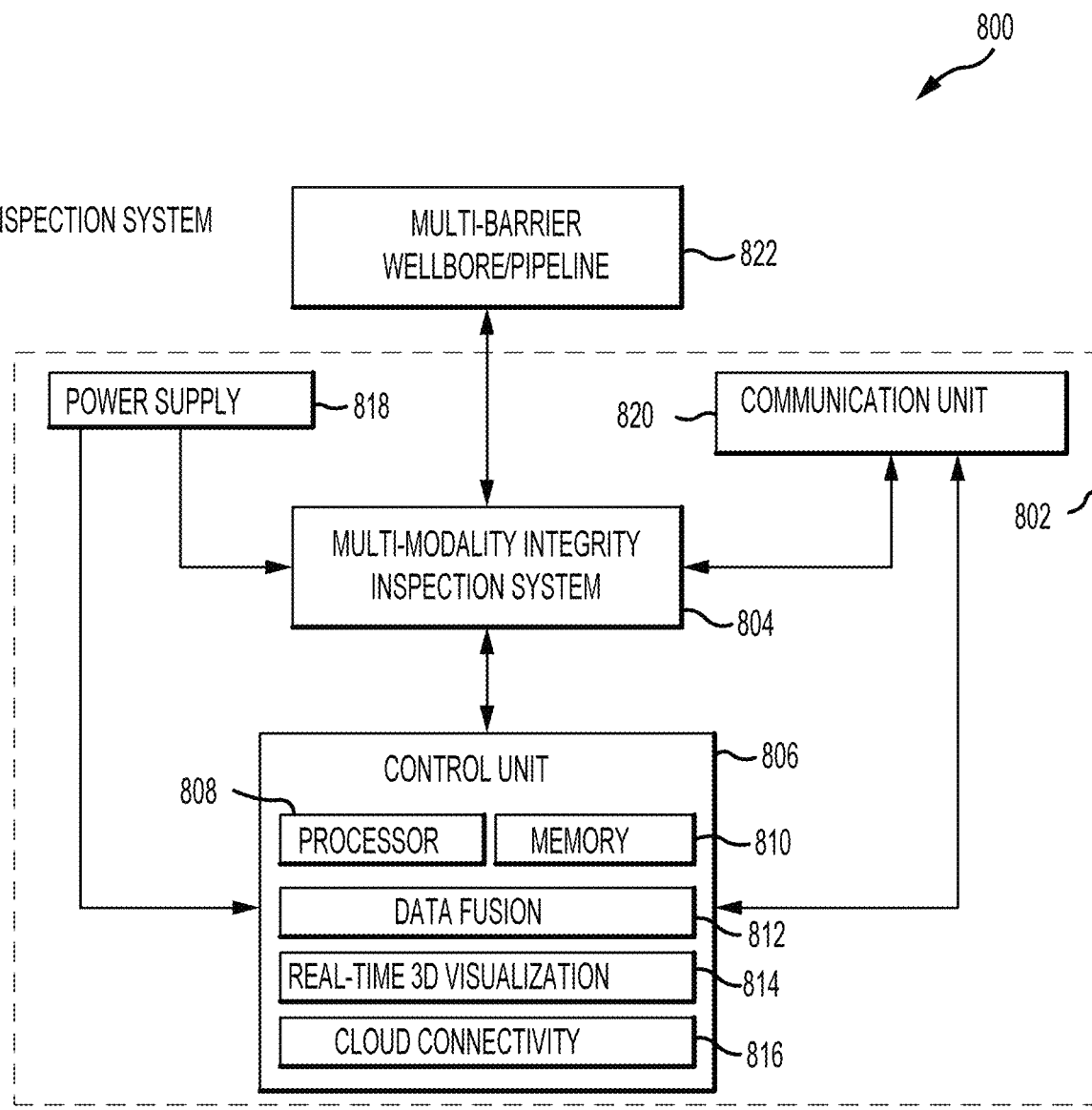
FIG. 8 is a diagram illustrating various components of a multi-modality well inspection system, in accordance with various embodiments.

FIG. 8 is a diagram 800 illustrating various components of a multi-modality well inspection system 802, in which an inspection tool 804 is coupled to (e.g., disposed therein) a wellbore or a pipeline 822. The system 802 further includes a communication unit 820 communicatively coupled to the inspection tool 804 for receiving and transmitting data and control. The system includes a power supply 818 for powering the inspection tool 804. The system 802 includes a control unit 806, which may be located at the surface. The control unit 806 may include a processor 808, a memory 810, a data fusion module 812 for fusing data collected by two or more modalities, a real-time 3D visualization module 814 for generating 3D visual representations of the data, and a cloud connectivity module 816 for sharing the data and generated visual representations of the data. In some embodiment, the data may be shared in real-time as it is collected or processed. In some embodiments, the data is collected, process, and shared, in real-time subject to any hardware or software processing limitations.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

We claim:
1. A downhole inspection system, comprising:
a tool string lowerable into a wellbore;
a first imaging device forming at least a portion of the tool string, the first imaging device operable to generate first imaging data for detecting potential wellbore eccentricity anomalies, wherein the first imaging device comprises:
a first source operable to emit energy of a first non-optical modality towards a target; and
a first detector operable to detect returning energy from the target;
a second imaging device forming at least another portion of the tool string, the second imaging device operable to generate second imaging data for detecting potential wellbore anomalies, wherein the second imaging device comprises:
a second source operable to emit energy of a second modality towards the target; and
a second detector operable to detect returning energy from the target; and a processor configured to:
receive the first imaging data and the second imaging data;
reshape the first imaging data and the second imaging data to a common size;
scale the first imaging data and the second imaging data to comparable intensity levels; and
combine the eccentricity anomalies from the first imaging data with the second imaging data to provide enhanced data for detecting wellbore anomalies.

2. The system of claim 1, wherein the first imaging device includes a gamma imaging device, the energy of the first modality includes gamma rays, and the first imaging data is gamma imaging data.

3. The system of claim 1, wherein the first imaging device includes a neutron imaging device, the energy of the first modality includes neutrons, and the first imaging data is neutron imaging data.

4. The system of claim 1, wherein the first imaging device includes an electromagnetic imaging device, the energy of the first modality includes electromagnetic pulses, and the first imaging data is electromagnetic imaging data.

5. The system of claim 1, wherein the first imaging device includes an ultrasound imaging device, the energy of the first modality includes ultrasound waves, and the first imaging data is ultrasound imaging data.

6. The system of claim 1, wherein the first imaging device and the second imaging device are axially aligned with the wellbore.

7. The system of claim 1, wherein the first imaging device includes any combination of a gamma device, a neutron device, an electromagnetic device, a magnetic device, an ultrasound device, an acoustic device, or an x-ray device, and wherein the second imaging device includes any combination of a gamma device, a neutron device, an electromagnetic device, a magnetic device, an ultrasound device, an acoustic device, a fiber optical device, or an x-ray device.

8. The system of claim 1, wherein the processor is located remotely from the tool string.

9. The system of claim 1, wherein the processor is located on the tool string.

10. The system of claim 1, wherein the first imaging data is indicative of the presence of a first type of wellbore anomaly and the second imaging data is indicative of the presence of a second type of wellbore anomaly.

11. A downhole inspection system, comprising:
a first imaging device operable to generate first imaging data indicative of wellbore eccentricity anomalies, the first imaging device comprising:
a first source operable to emit energy of a first modality based on a first physics-based mechanism; and
a first detector operable to detect returning energy induced by the emitted energy of the first modality;
a second imaging device operable to generate second imaging data, the second imaging device comprising:
a second source operable to emit energy of a second modality based on a second physics-based mechanism different from the first physics-based mechanism; and
a second detector operable to detect returning energy induced by the emitted energy of the second modality; and
a processor configured to:
receive the first imaging data and the second imaging data;
reshape the first imaging data and the second imaging data to a common size;
scale the first imaging data and the second imaging data to comparable intensity levels; and
combine the eccentricity anomalies from the first imaging data with the second imaging data into an enhanced data stream.

12. The system of claim 11, further comprising:
a third imaging device operable to generate third imaging data, the third imaging device comprising:
a third source operable to emit energy of a third modality; and
a third detector operable to detect returning energy;
wherein the enhanced data stream includes the third imaging data.

13. The system of claim 12, wherein the first imaging device includes a neutron device, the second imaging device includes a gamma device, and the third imaging device includes an electromagnetic device.

14. The system of claim 11, wherein the first imaging device and the second imaging device include any combination of a gamma device, a neutron device, an electromagnetic device, a magnetic device, an ultrasound device, an acoustic device, a fiber optical device, or an x-ray device.

15. The system of claim 11, wherein the processor is located remotely from the tool string.

16. A method of inspecting a wellbore, comprising:
positioning a first imaging device in a wellbore having a casing comprising one or more layers;
emitting energy of a first non-optical modality towards the wellbore;
detecting first returning energy from the wellbore;
generating first imaging data for detecting wellbore eccentricity anomalies-based at least in part on the detected first returning energy;
positioning a second imaging device in the wellbore;
generating energy of a second modality towards the wellbore;
detecting second returning energy from the wellbore;
generating second imaging data of the wellbore based at least in part on the detected second returning energy;
reshaping the first imaging data and the second imaging data to a common size;
scaling the first imaging data and the second imaging data to comparable intensity levels;
and
correlating the wellbore eccentricity anomalies from the first imaging data and the second imaging data to provide enhanced data for detecting wellbore anomalies.

17. The method of claim 16, further comprising:
lowering a tool string into the wellbore, wherein the first imaging device and second imaging device form parts of the tool string.

18. The method of claim 16, further comprising:
lowering the first imaging device into the wellbore during a first tool run; and
lowering the second imaging device into the wellbore during a second tool run.

19. The method of claim 16, wherein the first imaging data is indicative of the presence of a first type of wellbore anomaly and the second imaging data is indicative of the presence of a second type of wellbore anomaly.

20. The method of claim 16, wherein the first imaging device includes any combination of a gamma device, a neutron device, an electromagnetic device, a magnetic device, an ultrasound device, an acoustic device, or an x-ray device, and wherein the second imaging device includes any combination of a gamma device, a neutron device, an electromagnetic device, a magnetic device, an ultrasound device, an acoustic device, a fiber optical device, or an x-ray device.

21. The downhole inspection system of claim 1, wherein the first and second modalities are selected from the group consisting of an electromagnetic modality, a magnetic flux leakage modality, an ultrasound modality, an acoustic modality, a neutron modality, and a gamma modality.

* * * * *